(12) United States Patent
Hussain et al.

(10) Patent No.: US 12,537,798 B2
(45) Date of Patent: Jan. 27, 2026

(54) ENHANCED INTERNET PROTOCOL SECURITY MANAGEMENT FOR VIRTUAL PRIVATE NETWORK CONCENTRATORS

(71) Applicant: CenturyLink Intellectual Property LLC, Broomfield, CO (US)

(72) Inventors: Asghar Hussain, McLean, VA (US); Pavan Rampalli, Englewood, CO (US); Zubin Ingah, Centennial, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 144 days.

(21) Appl. No.: 18/514,284

(22) Filed: Nov. 20, 2023

(65) Prior Publication Data
US 2024/0171546 A1    May 23, 2024

Related U.S. Application Data

(60) Provisional application No. 63/384,771, filed on Nov. 22, 2022.

(51) Int. Cl.
*H04L 9/40* (2022.01)
(52) U.S. Cl.
CPC ........ *H04L 63/0272* (2013.01); *H04L 63/029* (2013.01); *H04L 63/20* (2013.01)
(58) Field of Classification Search
CPC .... H04L 63/0272; H04L 63/029; H04L 63/20
See application file for complete search history.

(56) References Cited

U.S. PATENT DOCUMENTS

| 2004/0225895 A1* | 11/2004 | Mukherjee | ............ H04L 63/164 726/15 |
| 2007/0008980 A1* | 1/2007 | Dommety | ............. H04W 28/06 370/395.52 |

(Continued)

FOREIGN PATENT DOCUMENTS

| WO | WO-2015092491 A1 * | 6/2015 | ......... H04L 12/4633 |
| WO | WO-2015198094 A1 * | 12/2015 | ......... H04L 12/4633 |

OTHER PUBLICATIONS

International Search Report and Written Opinion of the International Searching Authority, dated Mar. 22, 2024, Int'l Appl. No. PCT/US2023/080504, Int'l Filing Date Nov. 20, 2023; 10 pgs.

(Continued)

*Primary Examiner* — Hee Soo Kim (57) ABSTRACT

This disclosure describes systems, methods, and devices related to managing Internet Protocol Security (IPsec) for virtual private network (VPN) concentrators. A method may include: identifying, by an edge gateway backend system, a first IPsec tunnel, a second IPsec tunnel, and a third IPsec tunnel between a VPN client and a VPN concentrator of the edge gateway backend system; determining, by the edge gateway backend system, that the first IPsec tunnel is a highest priority tunnel between the VPN client and the VPN concentrator; determining, by the edge gateway backend system, that the highest priority tunnel between the VPN client and the VPN concentrator is active; and deactivating, by the edge gateway backend system, fully qualified domain names of the second IPsec tunnel and the third IPsec tunnel from the VPN concentrator based on the determination that the highest priority tunnel between the VPN client and the VPN concentrator is active.

20 Claims, 5 Drawing Sheets

(56) References Cited

U.S. PATENT DOCUMENTS

| | | | |
|---|---|---|---|
| 2009/0199290 A1* | 8/2009 | McCullough | H04L 63/0485 726/12 |
| 2015/0295855 A1* | 10/2015 | Karthikeyan | H04L 43/0876 370/232 |
| 2018/0248761 A1* | 8/2018 | Ng | H04L 12/4633 |
| 2022/0141084 A1 | 5/2022 | Vuggrala | |

OTHER PUBLICATIONS

International Preliminary Report on Patentability, dated Jun. 5, 2025, Int'l Appl. No. PCT/US2023/080504, Int'l Filing Date Nov. 22, 2022; 8 pgs.

* cited by examiner

ENHANCED INTERNET PROTOCOL SECURITY MANAGEMENT FOR VIRTUAL PRIVATE NETWORK CONCENTRATORS

CROSS-REFERENCE TO RELATED APPLICATIONS

This application is related to and claims priority under 35 U.S.C. § 119(c) from U.S. Patent Application No. 63/384,771, filed Nov. 22, 2022, titled "ENHANCED INTERNET PROTOCOL SECURITY MANAGEMENT FOR VIRTUAL PRIVATE NETWORK CONCENTRATORS," the entire content of which is incorporated herein by reference for all purposes.

TECHNICAL FIELD

Embodiments of the present invention generally relate to systems and methods for managing Internet Protocol Security (IPsec) for virtual private network (VPN) concentrators.

BACKGROUND

Virtual Private Network (VPN) concentrators are used to connect clients and remote networks to another network. Security protocols may be implemented to protect the communications. However, VPN scaling for security protocols may be limited, and current techniques may need persistent security protocol tunnels on each wireless area network in which only one security protocol session may be used for data traffic while the other tunnels may be redundant.

SUMMARY

A method for managing Internet Protocol Security (IPsec) for virtual private network (VPN) concentrators may include: identifying, by an edge gateway backend system, a first IPsec tunnel, a second IPsec tunnel, and a third IPsec tunnel between a VPN client and a VPN concentrator of the edge gateway backend system; determining, by the edge gateway backend system, that the first IPsec tunnel is a highest priority tunnel between the VPN client and the VPN concentrator; and determining, by the edge gateway backend system, that the highest priority tunnel between the VPN client and the VPN concentrator is active, wherein fully qualified domain names of the second IPsec tunnel and the third IPsec tunnel are absent from the VPN concentrator based on the determination that the highest priority tunnel between the VPN client and the VPN concentrator is active.

A system for managing Internet Protocol Security (IPsec) for virtual private network (VPN) concentrators may include memory coupled to at least one processor of an edge gateway backend system, the at least one processor configured to: identify a first IPsec tunnel between a VPN client and a VPN concentrator of the edge gateway backend system; identify a second IPsec tunnel between the VPN client and the VPN concentrator; identify a third IPsec tunnel between the VPN client and the VPN concentrator; determine that the first IPsec tunnel is a highest priority tunnel between the VPN client and the VPN concentrator; and determine that the highest priority tunnel between the VPN client and the VPN concentrator is active, wherein fully qualified domain names of the second IPsec tunnel and the third IPsec tunnel are absent from the VPN concentrator based on the determination that the highest priority tunnel between the VPN client and the VPN concentrator is active.

A non-transitory computer-readable storage medium may include instructions to cause at least one processor of an edge gateway backend system for managing Internet Protocol Security (IPsec) for virtual private network (VPN) concentrators, upon execution of the instructions by the at least one processor, to: identify a first IPsec tunnel between a VPN client and a VPN concentrator of the edge gateway backend system; identify a second IPsec tunnel between the VPN client and the VPN concentrator; identify a third IPsec tunnel between the VPN client and the VPN concentrator; determine that the first IPsec tunnel is a highest priority tunnel between the VPN client and the VPN concentrator; and determine that the highest priority tunnel between the VPN client and the VPN concentrator is active, wherein fully qualified domain names of the second IPsec tunnel and the third IPsec tunnel are absent from the VPN concentrator based on the determination that the highest priority tunnel between the VPN client and the VPN concentrator is active.

DETAILED DESCRIPTION

Aspects of the present disclosure involve systems, methods, and the like, for enhanced management of Internet Protocol Security (IPsec) for virtual private network (VPN) concentrators.

Virtual Private Network (VPN) concentrators are network devices used to connect clients and remote networks to another network. VPON concentrators allow multiple VPN tunnels (sometimes encrypted) to simultaneously access a VPN network (e.g., simultaneous VPN tunnels for many users), and represent a larger-scale version of VPN routers. VPN concentrators may provide different addresses to respective users, maintain data encryption, ensure that resources are only accessed by authorized users, and protect the end-to-end delivery of data. For example, a large company with many remote users may benefit from use of a VPN concentrator.

Edge gateways and universal customer premises equipment (UCPE) may have virtual network functions and VPN clients. The VPN clients may have multiple Internet Protocol Security (IPsec) tunnels to a VPN concentrator, but only one tunnel per VPN client may be used for data traffic at a time. The other Internet Protocol Security (IPsec) tunnels between a VPN client and the VPN concentrator may be backup/redundant tunnels.

When scaling up UCPEs to establish multiple Internet Protocol Security (IPsec) tunnels for multiple VPN clients, too many tunnels and corresponding configurations may be established for the VPN concentrator. For example, the wireless area networks of the tunnels each may use fully qualified domain names (FQDNs) to be managed by the VPN concentrator. Because the VPN concentrator may have a limited number of tunnels and configurations that it may maintain, scalability of UCPEs and edge gateways may be limited.

There is therefore a need for enhanced management of IPsec for VPN concentrators.

In one or more embodiments, an adaptive IPsec management design for VPN concentrators may include an algorithm for adding all wireless area networks (e.g., FQDNs) to a VPN concentrator, and learning the number of wide area networks (WANs) and their priority from ordering systems.

In one or more embodiments, a UCPE may initiate IPsec sessions on any and all WANs during an activation/staging phase, and may establish the IPsec tunnels with the VPN concentrator. When the UCPE calls home from a customer premise, the adaptive algorithm may initiate, and only the IPsec of the highest priority WAN may be retained, while the other IPsec tunnels for the UPCE to the VPN concentrator may be removed (e.g., by removing the FQDN configurations from the VPN concentrator). As a result, the VPN concentrator's session threshold may be increased.

In one or more embodiments, the VPN concentrator may monitor active IPsec sessions periodically. When an active IPsec session is down, all other WAN FQDNs may be added to the VPN concentrator to establish IPsec over the backup/redundant WANs, and the learning/monitoring process may continue. When the highest priority WAN becomes active again, the other WAN FQDNs may be removed from the VPN concentrator. In this manner, rather than maintaining the backup/redundant IPsec FQDNs at the VPN concentrator, limiting the VPN concentrator's session scalability, the backup/redundant IPsec FQDNs may be removed from the VPN concentrator until it is detected that the highest priority WAN has become inactive, at which time the backup/redundant IPsec FQDNs may be added to the VPN concentrator to maintain communication with a UCPE/edge gateway.

In one or more embodiments, the VPN concentrator may be configured with a capacity threshold (e.g., 80% or some other number), allowing the remaining capacity to be reserved for the redundant/backup tunnels. The backup reservation percentage may vary based on the learning process.

For comparison, an existing persistent IPsec management technique may have a VPN concentrator capacity of 2000 tunnels, so the number of UCPEs with three WANs each that may connect to the VPN concentrator concurrently is 666. The adaptive IPsec management technique herein may have the same 2000 tunnel capacity, but can allow for up to 1600 UCPEs with three WANs each to connect concurrently to the VPN concentrator.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
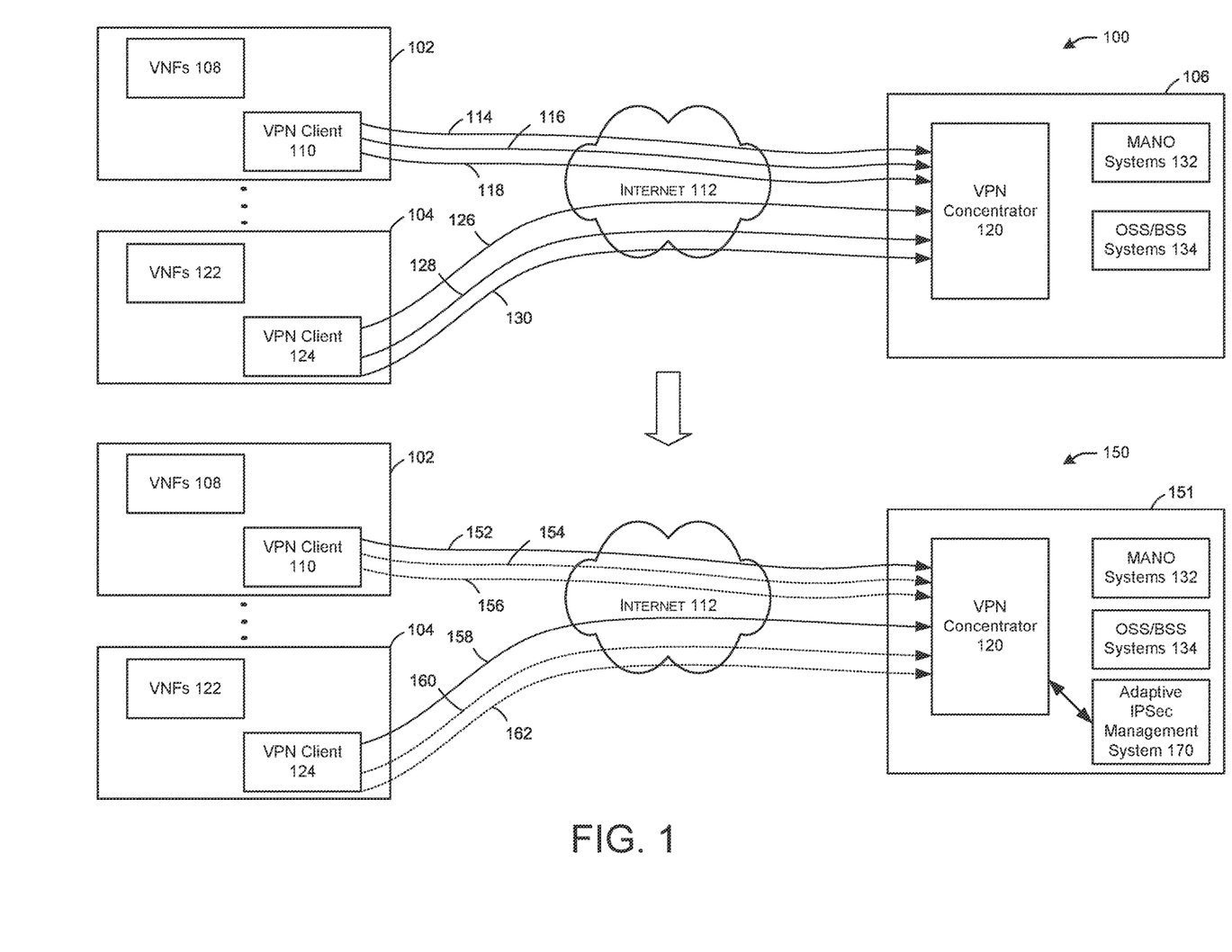
FIG. 1 illustrates an example systems for managing Internet Protocol Security (IPsec) for virtual private network (VPN) concentrators, in accordance with one embodiment.

FIG. 1 illustrates an example systems for managing Internet Protocol Security (IPsec) for virtual private network (VPN) concentrators, in accordance with one embodiment.

Referring to FIG. 1, a system 100 may include UCPE/edge gateways (e.g., UCPE/edge gateway 102, UCPE/edge gateway 104) connecting to edge gateway backend systems 106. The UCPE/edge gateway 102 may include virtual network functions (VNFs) 108 for connecting a VPN client 110, using the Internet 112, to the edge gateway backend systems 106. In particular, the VPN client 110 may have multiple tunnels (e.g., tunnel 114, tunnel 116, and tunnel 118), which may use a secure protocol like IPsec to connect to the edge gateway backend systems 106 via a VPN concentrator 120. The tunnel 114, the tunnel 116, and the tunnel 118 may be used as persistent management IPsec sessions concurrently. Similarly, the UCPE/edge gateway 104 may include VNFs 122 for connecting a VPN client 124, using the Internet 112, to the edge gateway backend systems 106. In particular, the VPN client 124 may have multiple tunnels (e.g., tunnel 126, tunnel 128, and tunnel 130), which may use a secure protocol like IPsec to connect to the edge gateway backend systems 106 via the VPN concentrator 120. The tunnel 126, the tunnel 128, and the tunnel 130 may be used as persistent management IPsec sessions concurrently. The edge gateway backend systems 106 may include management and orchestration systems 132 and operational support systems/business support systems (e.g., OSS/BSS systems 134).

Still referring to FIG. 1, the number of UCPEs/edge gateways that may connect to the edge gateway backend systems 106 via the VPN concentrator 120 may increase using a system 150 with respect to the system 100 because of the way the tunnels are managed by the VPN concentrator 120. In particular, the VPN concentrator 120 may maintain one of the tunnels (e.g., tunnel 152 of the VPN client 110) as a persistent management IPsec session (e.g., a highest-priority tunnel/session) while tunnels 154 and 156 of the VPN client 110 are made backup/inactive IPsec sessions that only the edge gateway backend systems 106 may activate as explained further herein. Similarly, the VPN concentrator 120 may maintain one of the tunnels (e.g., tunnel 158 of the VPN client 124) as a persistent management IPsec session (e.g., a highest-priority tunnel/session) while tunnels 160 and 162 of the VPN client 124 are made backup/inactive IPsec sessions that only the edge gateway backend systems 106 may activate as explained further herein. In particular, the edge gateway backend systems 106 of the system 150 may include edge gateway backend systems 151 with the MANO systems 132, OSS/BSS systems 134, and an adaptive IPsec management system 170 for adaptively managing which tunnel of a given VPN client is to be active and which tunnels of a given VPN client are to be backups/inactive at a given time.

In one or more embodiments, the adaptive IPsec management system 170 may include an algorithm for adding all wireless area networks (e.g., FQDNs) to the VPN concentrator 120, and learning the number of WANs (e.g., corresponding to the respective tunnels) and their priority from ordering systems.

In one or more embodiments, a UCPE (e.g., the UCPE/edge gateway 102) may initiate IPsec sessions on all WANs (e.g., tunnel 152, tunnel 154, and tunnel 156) during an activation/staging phase, and may establish the IPsec tunnels with the VPN concentrator 120. When the UCPE calls home from a customer premise, the adaptive algorithm of the adaptive IPsec management system 170 may initiate, and only the IPsec of the highest priority WAN may be retained (e.g., the tunnel 152), while the other IPsec tunnels (e.g., the tunnels 154 and 156) for the UPCE to the VPN concentrator 120 may be removed (e.g., by removing the FQDN configurations from the VPN concentrator 120). As a result, the VPN concentrator's session threshold may be increased. For example, when the VPN concentrator 120 has a tunnel capacity of 2000 tunnels that may be concurrently maintained, and when the VPN clients each use three WANs tunneled to the VPN concentrator 120 at a time, the number of VPN clients that may be connected would be 666 (e.g., 2000 divided by 3 active WANs per device=666 devices). Using the system 150, however, would increase the capacity to 1600 connected VPN clients when using a capacity limit of 80% (e.g., 2000 divided by 1 active WAN per device=2000 devices*0.8 capacity=1600 devices).

Figure 2:
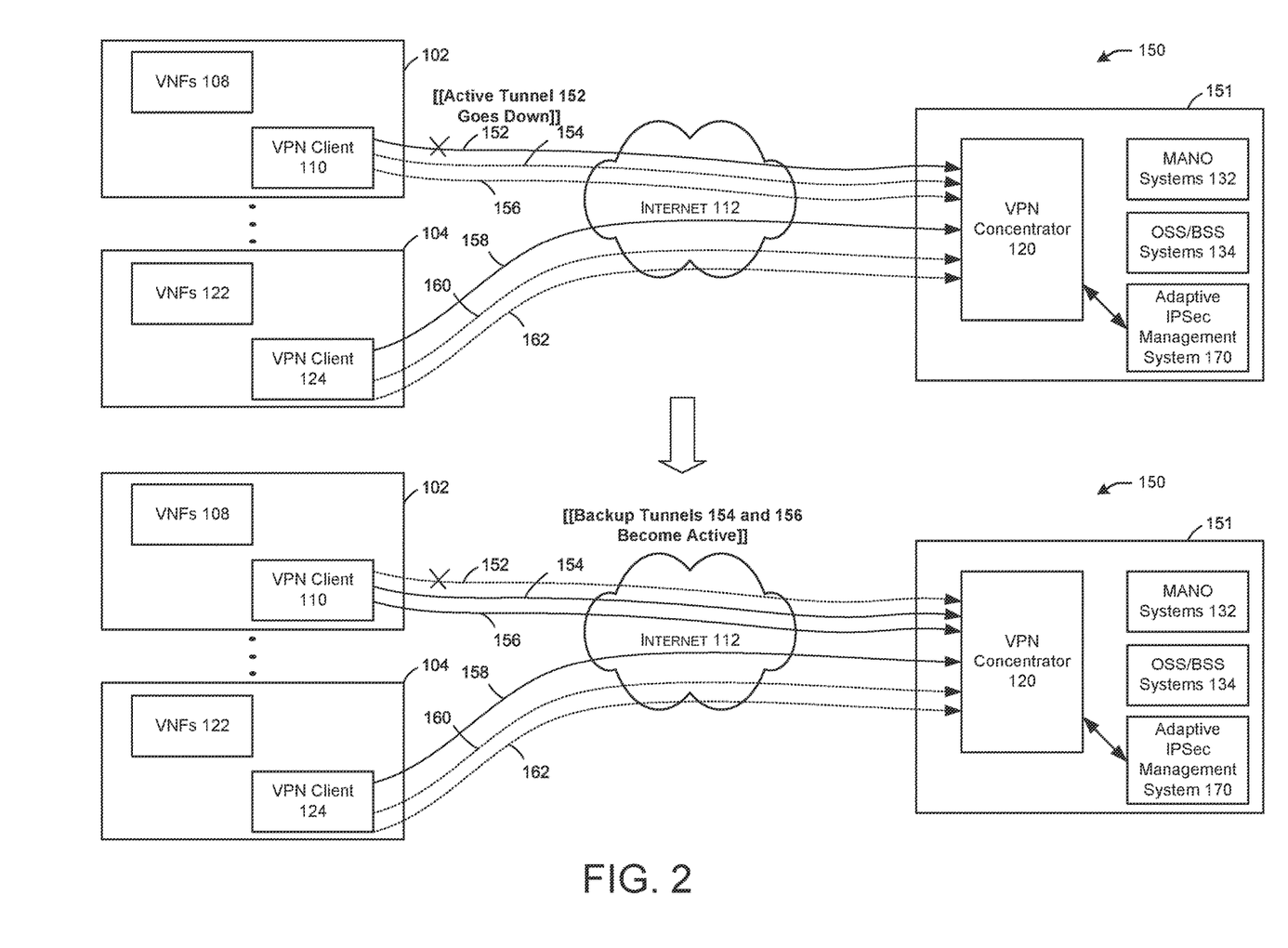
FIG. 2 shows an example process for the adaptive system for managing IPsec for VPN concentrators of FIG. 1 when a highest-priority IPsec tunnel goes down, in accordance with one embodiment.
Figure 3:
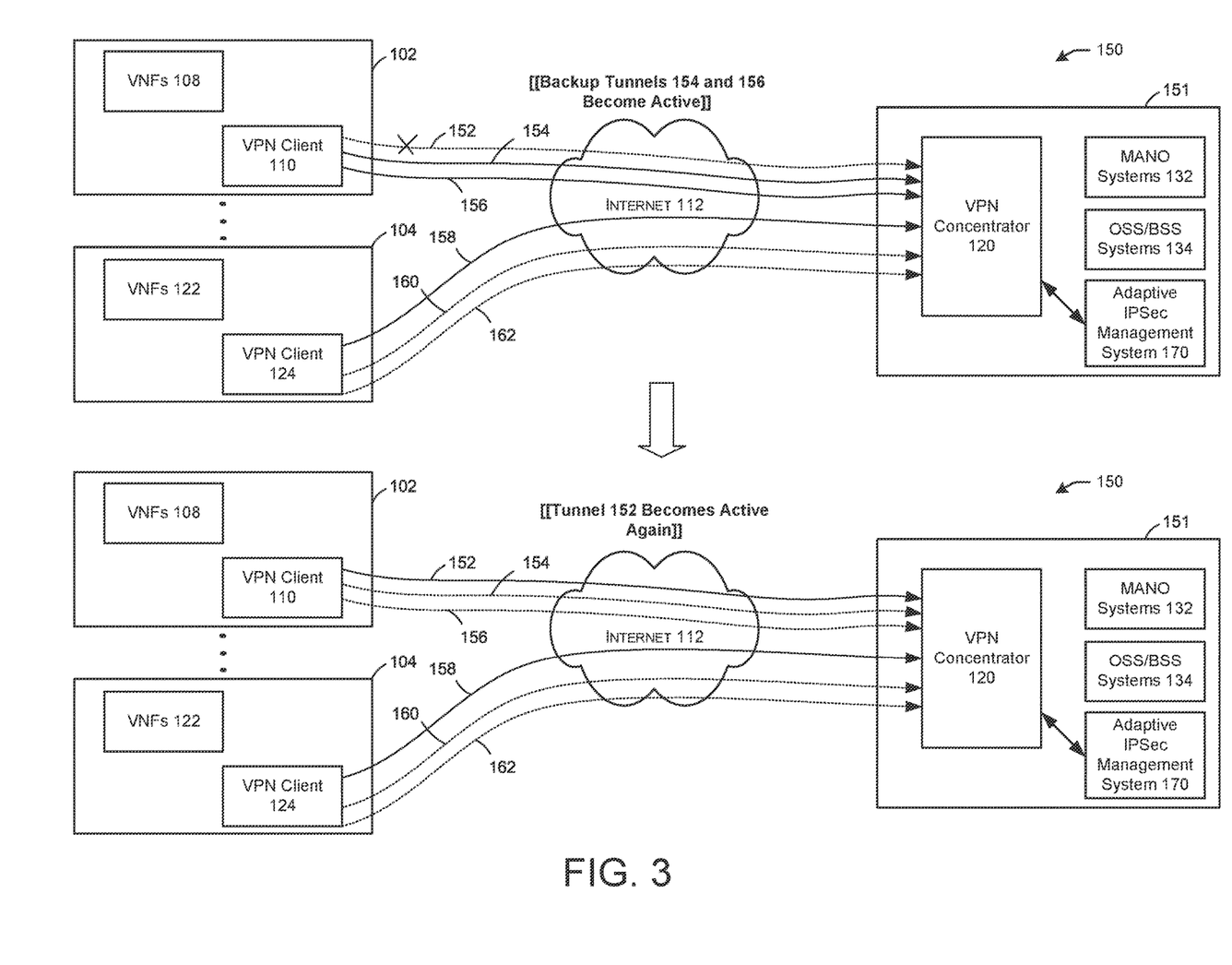
FIG. 3 shows an example process for the adaptive system for managing IPsec for VPN concentrators of FIG. 1 when the highest-priority IPsec tunnel becomes active again after going down as shown in FIG. 2, in accordance with one embodiment.

In one or more embodiments, the VPN concentrator 120 may monitor active IPsec sessions of the tunnels periodically. When an active IPsec session is down (e.g., as shown in FIG. 2), all other WAN FQDNs may be added (e.g., by the adaptive IPsec management system 170) to the VPN concentrator 120 to establish IPsec over the backup/redundant WANs, and the learning/monitoring process may continue. When the highest priority WAN becomes active again (e.g., as shown in FIG. 3), the other WAN FQDNs may be removed from the VPN concentrator 120 (e.g., by the adaptive IPsec management system 170). In this manner, rather than maintaining the backup/redundant IPsec FQDNs at the VPN concentrator 120, limiting the VPN concentrator's session scalability, the backup/redundant IPsec FQDNs may be removed from the VPN concentrator 120 until the VPN concentrator 120 detects that the highest priority WAN has become inactive, at which time the backup/redundant IPsec FQDNs may be added to the VPN concentrator 120 (e.g., by the adaptive IPsec management system 170) to maintain communication with a UCPE/edge gateway.

In one or more embodiments, the VPN concentrator 120 may be configured with a capacity threshold (e.g., 80% or some other number), allowing the remaining capacity to be reserved for the redundant/backup tunnels. The backup reservation percentage may vary based on the learning process.

FIG. 2 shows an example process for the adaptive system for managing IPsec for VPN concentrators of FIG. 1 when a highest-priority IPsec tunnel goes down, in accordance with one embodiment.

Referring to FIG. 2, using the system 150 of FIG. 1 with the adaptive IPsec management system 170, when the active tunnel 152 (e.g., as the highest priority tunnel for the VPN client 110) goes down, the adaptive IPsec management system 170 may add the WAN FQDNs of the tunnel 154 and the tunnel 156 for the VPN client 110 (e.g., the backup/inactive WANs) to the VPN concentrator 120 to establish IPsec over the backup/redundant WANs, and the learning/monitoring process may continue. When the highest priority WAN becomes active again (e.g., as shown in FIG. 3), the adaptive IPsec management system 170 may remove the other WAN FQDNs (e.g., for the tunnel 154 and the tunnel 156) from the VPN concentrator 120 (e.g., by the adaptive IPsec management system 170). In this manner, rather than maintaining the backup/redundant IPsec FQDNs at the VPN concentrator 120, limiting the VPN concentrator's session scalability, the backup/redundant IPsec FQDNs may be removed from the VPN concentrator 120 until the VPN concentrator 120 detects that the highest priority WAN has become inactive, at which time the backup/redundant IPsec FQDNs may be added to the VPN concentrator 120 (e.g., by the adaptive IPsec management system 170) to maintain communication with a UCPE/edge gateway.

FIG. 3 shows an example process for the adaptive system for managing IPsec for VPN concentrators of FIG. 1 when the highest-priority IPsec tunnel becomes active again after going down as shown in FIG. 2, in accordance with one embodiment.

Referring to FIG. 3, when the highest priority WAN (e.g., for the tunnel 152) becomes active again (e.g., after becoming inactive as shown in FIG. 2), the adaptive IPsec management system 170 may remove the other WAN FQDNs (e.g., for the tunnel 154 and the tunnel 156) from the VPN concentrator 120 (e.g., by the adaptive IPsec management system 170). In this manner, rather than maintaining the backup/redundant IPsec FQDNs at the VPN concentrator 120, limiting the VPN concentrator's session scalability, the backup/redundant IPsec FQDNs may be removed from the VPN concentrator 120 until the VPN concentrator 120 detects that the highest priority WAN has become inactive, at which time the backup/redundant IPsec FQDNs may be added to the VPN concentrator 120 (e.g., by the adaptive IPsec management system 170) to maintain communication with a UCPE/edge gateway.

Figure 4:
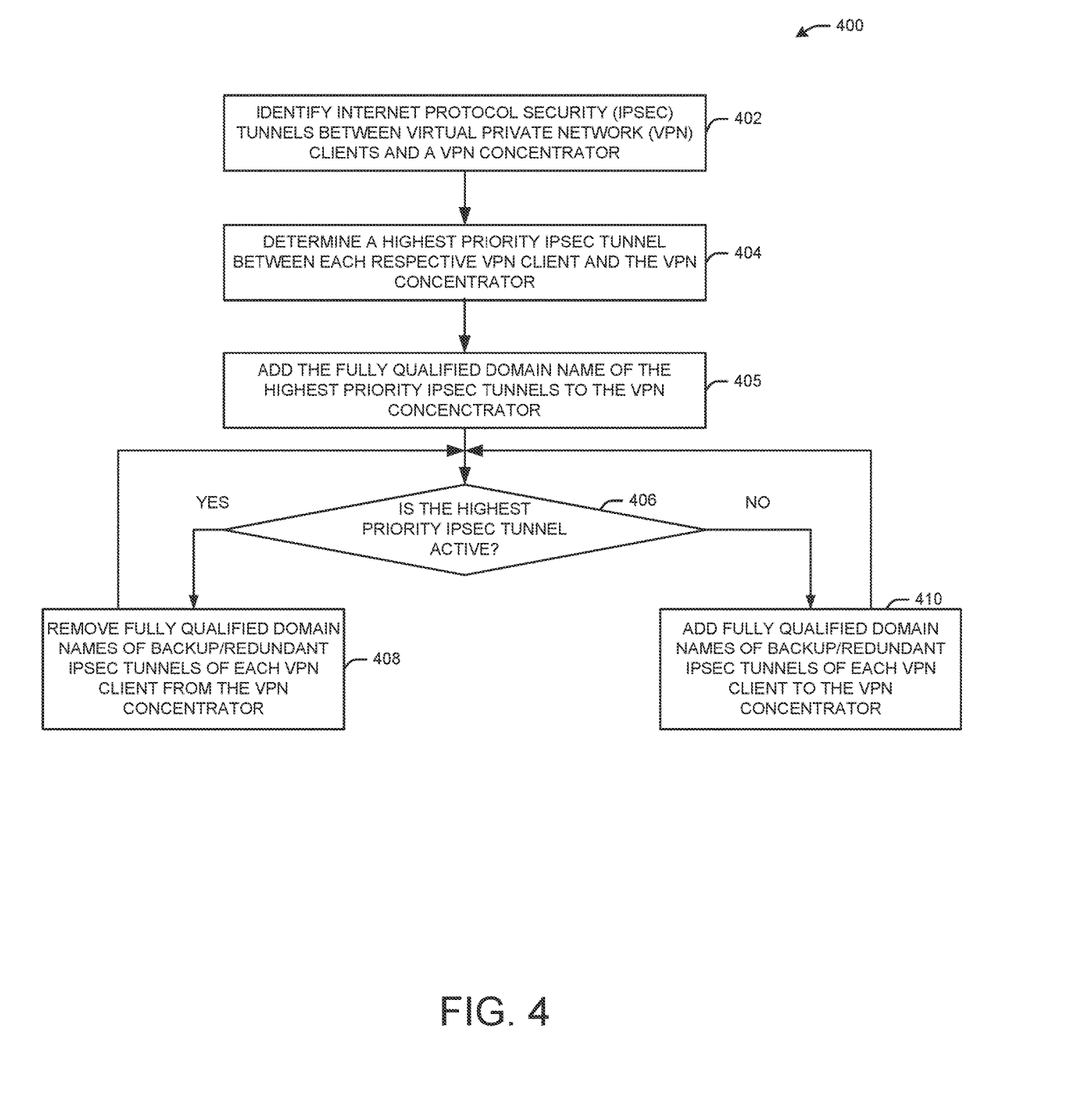
FIG. 4 is a flow for a process for managing IPsec for VPN concentrators, in accordance with one embodiment.

FIG. 4 is a flow for a process 400 for managing IPsec for VPN concentrators, in accordance with one embodiment.

At block 402, a device (e.g., the adaptive IPsec management system 170 of FIG. 1) may identify IPsec tunnels between VPN clients and a VPN concentrator (e.g., the VPN concentrator 120 of FIG. 1). Each VPN client may be allowed to have multiple IPsec tunnels to the VPN concentrator, each with respective WANs and FQDNs, but not all of the IPsec tunnels of each VPN client may be considered active by the device (or the VPN concentrator) at a time.

At block 404, the device may determine the highest priority IPsec tunnel of any VPN client connected to the VPN concentrator. The device may learn the highest priority IPsec tunnel using a learning algorithm.

At block 405, the device may add the FQDN of the highest priority IPsec tunnel of a respective VPN client to the VPN concentrator, and may remove or deactivate the FQDNs of the other IPsec tunnels between the respective VPN client and the VPN concentrator so that more VPN clients may connect to the VPN concentrator at the same time. The non-highest priority IPsec tunnels of a VPN client may be considered backup/redundant IPsec tunnels whose FQDNs and respective configurations may not be maintained by the device at the VPN concentrator until the highest priority IPsec tunnel of a VPN client becomes inactive.

At block 406, the device may determine whether the highest IPsec tunnel of a VPN client is active. If so, the process 400 may continue to block 408, where the FQDN and configuration of the highest priority IPsec tunnel is maintained at the VPN concentrator, and the FQDNs and configurations of the non-highest IPsec tunnels are removed or deactivated from the VPN concentrator. If not at block 406, the process 400 may continue to block 410, where the device may add the FQDNs and configurations of the backup/redundant IPsec tunnels of the VPN client to the VPN concentrator. The process 400 may continue from block 408 or block 410 back to block 406 to continue monitoring whether the highest priority IPsec tunnel of a VPN client is active or has again become active after being inactive.

It is understood that the above descriptions are for purposes of illustration and are not meant to be limiting.

Figure 5:
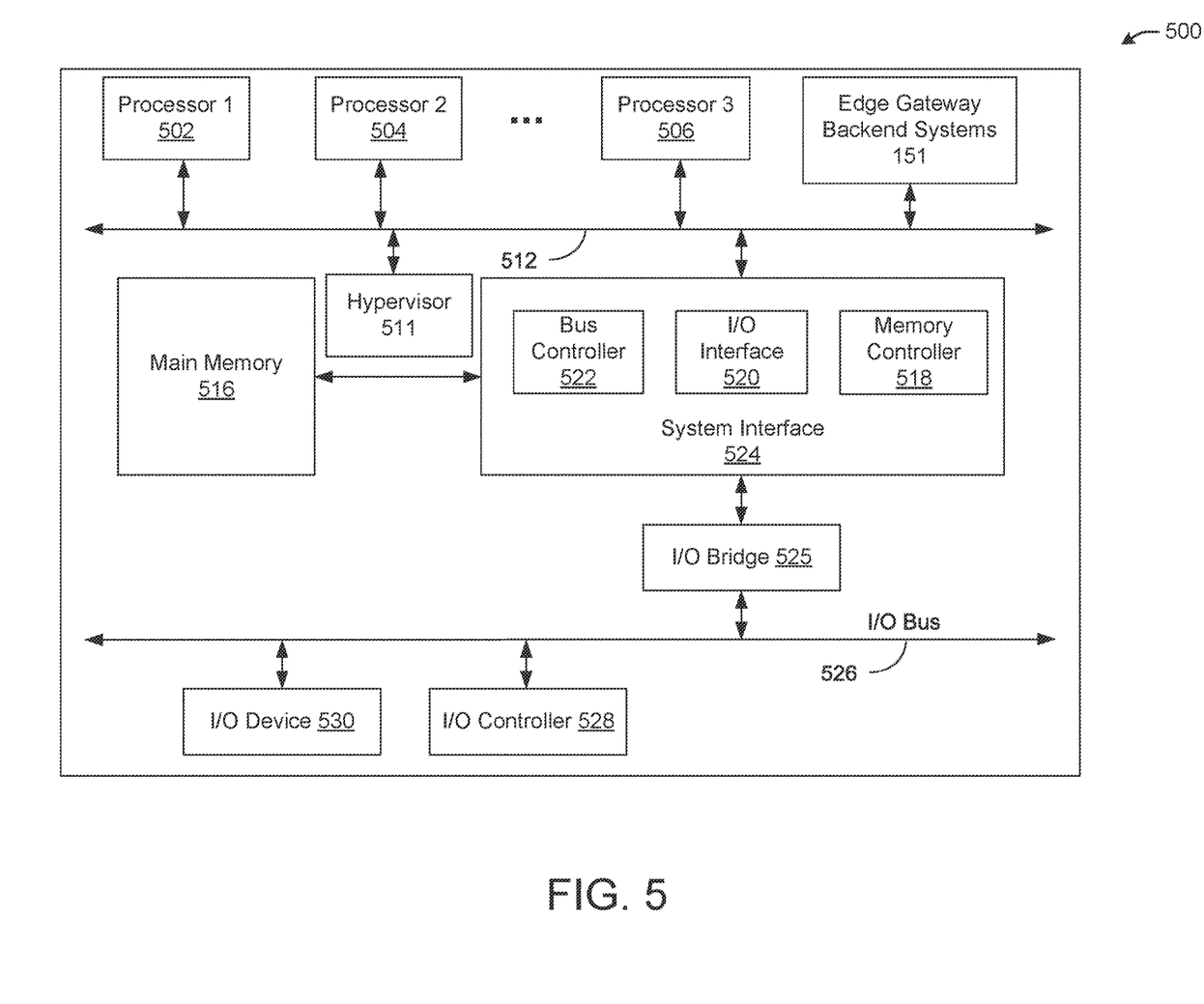
FIG. 5 is a diagram illustrating an example of a computing system that may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may represent at least a portion of the system 150 shown in FIG. 1, as discussed above. The computer system (system) includes one or more processors 502-506, the edge gateway backend system 151 of FIG. 1, and a hypervisor 511 for facilitating VNFs. Processors 502-506 may include one or more internal levels of cache (not shown) and a bus controller 522 or bus interface unit to direct interaction with the processor bus 512. Processor bus 512, also known as the host bus or the front side bus, may be used to couple the processors 502-506 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for managing Internet Protocol Security (IPsec) for virtual private network (VPN) concentrators, the method comprising:
   identifying, by at least one processor of an edge gateway backend system, a first IPsec tunnel between a VPN client and a VPN concentrator of the edge gateway backend system;
   identifying, by the at least one processor, a second IPsec tunnel between the VPN client and the VPN concentrator;
   identifying, by the at least one processor, a third IPsec tunnel between the VPN client and the VPN concentrator;
   determining, by the at least one processor, that the first IPsec tunnel is a highest priority tunnel between the VPN client and the VPN concentrator;
   determining, by the at least one processor, that the highest priority tunnel between the VPN client and the VPN concentrator is active; and
   deactivating, by the at least one processor, fully qualified domain names of the second IPsec tunnel and the third IPsec tunnel from the VPN concentrator based on the determination that the highest priority tunnel between the VPN client and the VPN concentrator is active.

2. The method of claim 1, wherein the second IPsec tunnel and the third IPsec tunnel are inactive at the VPN concentrator based on the highest priority tunnel between the VPN client and the VPN concentrator being active.

3. The method of claim 1, further comprising:
determining that the highest priority tunnel between the VPN client and the VPN concentrator is inactive; and
adding, based on the determination that the highest priority tunnel between the VPN client and the VPN concentrator is inactive, the fully qualified domain names of the second IPsec tunnel and the third IPsec tunnel to the VPN concentrator.

4. The method of claim 3, further comprising:
determining that the highest priority tunnel between the VPN client and the VPN concentrator has become active after being inactive; and
deactivating, based on the determination that the highest priority tunnel between the VPN client and the VPN concentrator has become active after being inactive, the fully qualified domain names of the second IPsec tunnel and the third IPsec tunnel from the VPN concentrator.

5. The method of claim 3, further comprising:
identifying a fourth IPsec tunnel between a second VPN client and the VPN concentrator;
identifying a fifth IPsec tunnel between the second VPN client and the VPN concentrator;
identifying a sixth IPsec tunnel between the second VPN client and the VPN concentrator;
determining that the fourth IPsec tunnel is a highest priority tunnel between the second VPN client and the VPN concentrator;
determining that the highest priority tunnel between the second VPN client and the VPN concentrator is active; and
deactivating fully qualified domain names of the fifth IPsec tunnel and the sixth IPsec tunnel from the VPN concentrator based on the determination that the highest priority tunnel between the second VPN client and the VPN concentrator is active.

6. The method of claim 5, further comprising:
determining that the highest priority tunnel between the second VPN client and the VPN concentrator is inactive; and
adding, based on the determination that the highest priority tunnel between the second VPN client and the VPN concentrator is inactive, the fully qualified domain names of the fifth IPsec tunnel and the sixth IPsec tunnel to the VPN concentrator.

7. The method of claim 6, further comprising:
determining that the highest priority tunnel between the second VPN client and the VPN concentrator has become active after being inactive; and
deactivating, based on the determination that the highest priority tunnel between the second VPN client and the VPN concentrator has become active after being inactive, the fully qualified domain names of the fifth IPsec tunnel and the sixth IPsec tunnel from the VPN concentrator.

8. The method of claim 1, further comprising determining a maximum number of active IPsec tunnels to be maintained by the VPN concentrator.

9. The method of claim 8, further comprising determining a maximum number of VPN clients that may connect to the VPN concentrator based on the maximum number of active IPsec tunnels to be maintained by the VPN concentrator.

10. A system for managing Internet Protocol Security (IPsec) for virtual private network (VPN) concentrators, the system comprising memory coupled to at least one processor of an edge gateway backend system, the at least one processor configured to:
identify a first IPsec tunnel between a VPN client and a VPN concentrator of the edge gateway backend system;
identify a second IPsec tunnel between the VPN client and the VPN concentrator;
identify a third IPsec tunnel between the VPN client and the VPN concentrator;
determine that the first IPsec tunnel is a highest priority tunnel between the VPN client and the VPN concentrator;
determine that the highest priority tunnel between the VPN client and the VPN concentrator is active; and
deactivate fully qualified domain names of the second IPsec tunnel and the third IPsec tunnel from the VPN concentrator based on the determination that the highest priority tunnel between the VPN client and the VPN concentrator is active.

11. The system of claim 10, wherein the second IPsec tunnel and the third IPsec tunnel are inactive at the VPN concentrator based on the highest priority tunnel between the VPN client and the VPN concentrator being active.

12. The system of claim 10, wherein the at least one processor is further configured to:
determine that the highest priority tunnel between the VPN client and the VPN concentrator is inactive; and
add, based on the determination that the highest priority tunnel between the VPN client and the VPN concentrator is inactive, the fully qualified domain names of the second IPsec tunnel and the third IPsec tunnel to the VPN concentrator.

13. The system of claim 12, wherein the at least one processor is further configured to:
determine that the highest priority tunnel between the VPN client and the VPN concentrator has become active after being inactive; and
deactivate, based on the determination that the highest priority tunnel between the VPN client and the VPN concentrator has become active after being inactive, the fully qualified domain names of the second IPsec tunnel and the third IPsec tunnel from the VPN concentrator.

14. The system of claim 12, wherein the at least one processor is further configured to:
identify a fourth IPsec tunnel between a second VPN client and the VPN concentrator;
identify a fifth IPsec tunnel between the second VPN client and the VPN concentrator;
identify a sixth IPsec tunnel between the second VPN client and the VPN concentrator;
determine that the fourth IPsec tunnel is a highest priority tunnel between the second VPN client and the VPN concentrator;
determine that the highest priority tunnel between the second VPN client and the VPN concentrator is active; and
deactivate fully qualified domain names of the fifth IPsec tunnel and the sixth IPsec tunnel from the VPN concentrator based on the determination that the highest priority tunnel between the second VPN client and the VPN concentrator is active.

15. The system of claim 14, wherein the at least one processor is further configured to:
- determine that the highest priority tunnel between the second VPN client and the VPN concentrator is inactive; and
- add, based on the determination that the highest priority tunnel between the second VPN client and the VPN concentrator is inactive, the fully qualified domain names of the fifth IPsec tunnel and the sixth IPsec tunnel to the VPN concentrator.

16. The system of claim 15, wherein the at least one processor is further configured to:
- determine that the highest priority tunnel between the second VPN client and the VPN concentrator has become active after being inactive; and
- deactivate, based on the determination that the highest priority tunnel between the second VPN client and the VPN concentrator has become active after being inactive, the fully qualified domain names of the fifth IPsec tunnel and the sixth IPsec tunnel from the VPN concentrator.

17. The system of claim 10, wherein the at least one processor is further configured to determine a maximum number of active IPsec tunnels to be maintained by the VPN concentrator.

18. The system of claim 10, wherein the at least one processor is further configured to determine a maximum number of VPN clients that may connect to the VPN concentrator based on the maximum number of active IPsec tunnels to be maintained by the VPN concentrator.

19. A non-transitory computer-readable storage medium comprising instructions to cause at least one processor of an edge gateway backend system for managing Internet Protocol Security (IPsec) for virtual private network (VPN) concentrators, upon execution of the instructions by the at least one processor, to:
- identify a first IPsec tunnel between a VPN client and a VPN concentrator of the edge gateway backend system;
- identify a second IPsec tunnel between the VPN client and the VPN concentrator;
- identify a third IPsec tunnel between the VPN client and the VPN concentrator;
- determine that the first IPsec tunnel is a highest priority tunnel between the VPN client and the VPN concentrator;
- determine that the highest priority tunnel between the VPN client and the VPN concentrator is active; and
- deactivate fully qualified domain names of the second IPsec tunnel and the third IPsec tunnel from the VPN concentrator based on the determination that the highest priority tunnel between the VPN client and the VPN concentrator is active.

20. The non-transitory computer-readable storage medium of claim 19,
- wherein the second IPsec tunnel and the third IPsec tunnel are inactive at the VPN concentrator based on the highest priority tunnel between the VPN client and the VPN concentrator being active.

\* \* \* \* \*